(12) United States Patent
Riedle et al.

(10) Patent No.: US 6,440,041 B1
(45) Date of Patent: Aug. 27, 2002

(54) METHOD OF CONTROLLING ENGINE TORQUE DURING LAUNCH FROM NEUTRAL IDLE OPERATION

(75) Inventors: Bradley Dean Riedle, Northville; Jeffrey Allen Doering, Canton; Ronald Thomas Cowan, Rochester Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/779,816

(22) Filed: Feb. 8, 2001

(51) Int. Cl.$^7$ .............................................. B60K 41/04
(52) U.S. Cl. ..................................................... 477/107
(58) Field of Search ................................. 477/174, 181, 477/107, 111

(56) References Cited

U.S. PATENT DOCUMENTS

| | | | |
|---|---|---|---|
| 4,476,745 A | 10/1984 | Moan | 74/866 |
| 4,526,065 A | 7/1985 | Rosen et al. | 74/869 |
| 4,766,544 A * | 8/1988 | Kurihara et al. | 364/424.1 |
| 5,272,630 A | 12/1993 | Brown et al. | 364/424.1 |
| 5,795,262 A | 8/1998 | Robinson | 477/92 |
| 6,325,744 B1 * | 12/2001 | Strieb | 477/181 |

* cited by examiner

*Primary Examiner*—Dirk Wright
(74) *Attorney, Agent, or Firm*—Julia Voutyras (57) ABSTRACT

A method of controlling engine torque in a motor vehicle having an internal combustion engine and multi-ratio transmission when launched from a neutral idle rest condition. At neutral idle, the transmission is controlled such that the input and output members are decoupled. During vehicle launch, two different strategies may be employed to control engine torque. One preferred method is to determine an engine brake torque limit as a function of time. Another preferred method to determine the engine brake torque limit is to estimate the torque capacity of the forward clutch at any given time using a mathematical model and a calibrated offset of turbine torque. Irrespective of the particular method used, the determined engine brake torque limit is compared to the corresponding engine torque amount that is requested by the vehicle operator. As a result, the actual engine torque output is optimized at all times to provide approximately the maximum amount of requested torque without exceeding the capacity of the transmission's forward clutch.

18 Claims, 5 Drawing Sheets

Fig. 1

|  | REV | FWD | DIR | LO/REV | 5CL | 2/4 BAND | HB & REV BAND | 1-4GR OWC |
|---|---|---|---|---|---|---|---|---|
| 1st |  | X |  | X |  |  | HB | X |
| 2nd |  | X |  |  |  | X | HB | X |
| 3rd |  | X | X |  |  |  | HB | X |
| 4th |  | X |  |  |  | X | HB | X |
| 5th |  |  | X |  | X | X |  |  |
| REV | X |  |  | X |  |  | REV |  |

FIG. 2

Prior Art

METHOD OF CONTROLLING ENGINE TORQUE DURING LAUNCH FROM NEUTRAL IDLE OPERATION

FIELD OF THE INVENTION

This invention relates in general to a method of controlling engine output torque delivered to an automatic transmission for an automotive vehicle. More particularly, this invention relates to a method of controlling engine torque to minimize inertia torque disturbances when the transmission's forward clutch is engaged upon the initiation of vehicle acceleration during launch from neutral idle operation.

BACKGROUND OF THE INVENTION

Neutral idle operation of a vehicle is generally characterized by (i) the vehicle at rest, (ii) service brakes applied, (iii) gear select lever in a forward range, and (iv) all combinations of torque transmitting clutches that establish a speed ratio from the input to the output member of the transmission being disengaged. Therefore, neutral idle operation is further characterized by the freely rotating transmission input shaft rotating at substantially synchronous speed with the engine output shaft. Such neutral idle operation is of course beneficial, for example, to reduce engine fueling requirements by unloading the engine at zero vehicle speed idle conditions.

When a vehicle begins moving after being held stationary, it is said that the vehicle is launching from neutral idle operation. One method of launching from neutral idle operation is for the vehicle operator to merely cease applying the service brakes, at which point the vehicle begins to slowly creep ahead. Commonly, however, a vehicle operator will also apply the accelerator pedal soon after releasing the service brakes. Aggressive accelerator pedal application—that is various combinations of (a) the time between release of the service brakes and the accelerator pedal application, (b) the magnitude of the accelerator pedal application, and (c) the rate of the accelerator pedal application—may result in poor shift quality. Poor shift quality may include such effects as large output torque disturbances, undesirably short and harsh shifts, and undesirably long shifts with associated high on-coming clutch heating and premature wear. The poor shift quality is a result of the engine torque demanded by the vehicle operator exceeding the torque capacity of the transmission's forward clutch while it is being engaged.

When a vehicle operator depresses the accelerator pedal from a neutral idle operation, engine torque output is demanded. As a result, the transmission's forward clutch begins to engage in order to transfer the demanded engine torque through the transmission. However, a certain amount of time is required to pressurize and fully engage the forward clutch to enable its full torque transfer capabilities. During this time period (the "launch period"), if the engine supplies torque in excess of the forward clutch's torque capacity, the forward clutch may slip, and the driver may experience uneven vehicle response.

One method that has been developed to address the problems associated with undesirable slippage of the forward clutch is described in U.S. Pat. No. 5,795,262, herein incorporated by reference. According to the method described in the '262 patent, engine torque output is controlled by limiting the actual amount of torque supplied by the engine during the launch period to a constant upper limit. Specifically, the engine torque output during the launch period is limited to the lesser of the torque requested by the vehicle operator and the constant upper engine brake torque limit. To ensure that the actual amount of engine torque output never exceeds the capacity of the forward clutch, the constant upper engine brake torque limit must be set based on the minimum clutch capacity. The inventors herein have recognized a disadvantage with this approach, namely the torque capacity of the transmission's forward clutch increases throughout the launch period. Therefore, while the conventional method of imposing a relatively low constant limit on the engine torque output prevents engine flare, it fails to maximize the available torque capacity of the forward clutch as it increases throughout the launch period. As a result, the conventional method of minimizing engine flare causes relatively sluggish performance of the vehicle's powertrain until the forward clutch is completely engaged.

SUMMARY OF THE INVENTION

The object of the present invention is to improve engine torque control during vehicle launch from neutral idle operation. The above object is achieved and disadvantages of prior approaches are overcome by a method for controlling a vehicle having an engine coupled to a transmission through a clutch, comprising determining an engine torque limit based on clutch torque capacity during launch from neutral idle operation, and adjusting an engine operating parameter to limit output engine torque to said engine torque limit.

According to the present invention, an engine brake torque limit is determined at various times throughout the launch period and until the forward clutch is fully engaged. Unlike the prior art, the engine brake torque limit varies throughout the launch period. Each time the engine brake torque limit is determined, it is compared to the engine torque requested by the vehicle operator at the corresponding time. Then, a microprocessor limits the actual engine torque output supplied at that particular time according to the lesser of the engine brake torque limit and the operator-requested engine torque.

The engine brake torque limit can be determined according to a variety of methods. One preferred method is to determine the engine brake torque limit at any given time based upon a pre-determined function. Specifically, because the torque capacity of the transmission's forward clutch increases with time, the engine brake torque limit can be determined purely as a function of time. Therefore, as the elapsed time since the end of the neutral idle operation increases, so does the engine brake torque limit. Another preferred method to determine the engine brake torque limit is to estimate the torque capacity of the forward clutch at any given time using a mathematical model. Using this second preferred method, the torque capacity of the forward clutch is estimated at various times based upon certain operating parameters, such as clutch pressure. Then, an engine brake torque limit is determined based on the estimated torque capacity of the forward clutch and a calibrated positive or negative offset of turbine torque.

Irrespective of the particular method used, the determined engine brake torque limit is compared to the corresponding engine torque amount that is requested by the vehicle operator. Throughout the launch period, a microprocessor controls engine operating conditions, such as engine air/fuel ratio and engine spark, to limit the actual engine torque output according to the lesser of the determined engine brake torque limits and the corresponding operator-requested engine torque. As a result, the actual engine torque output is optimized at all times to provide approximately the maximum amount of requested torque without exceeding the capacity of the transmission's forward clutch.

BRIEF DESCRIPTION OF THE DRAWINGS

Various objects and advantages of this invention will become apparent to those skilled in the art from the following detailed description of the preferred embodiment, when read in light of the accompanying drawings.

DETAILED DESCRIPTION OF PREFERRED EMBODIMENTS

Figure 1:
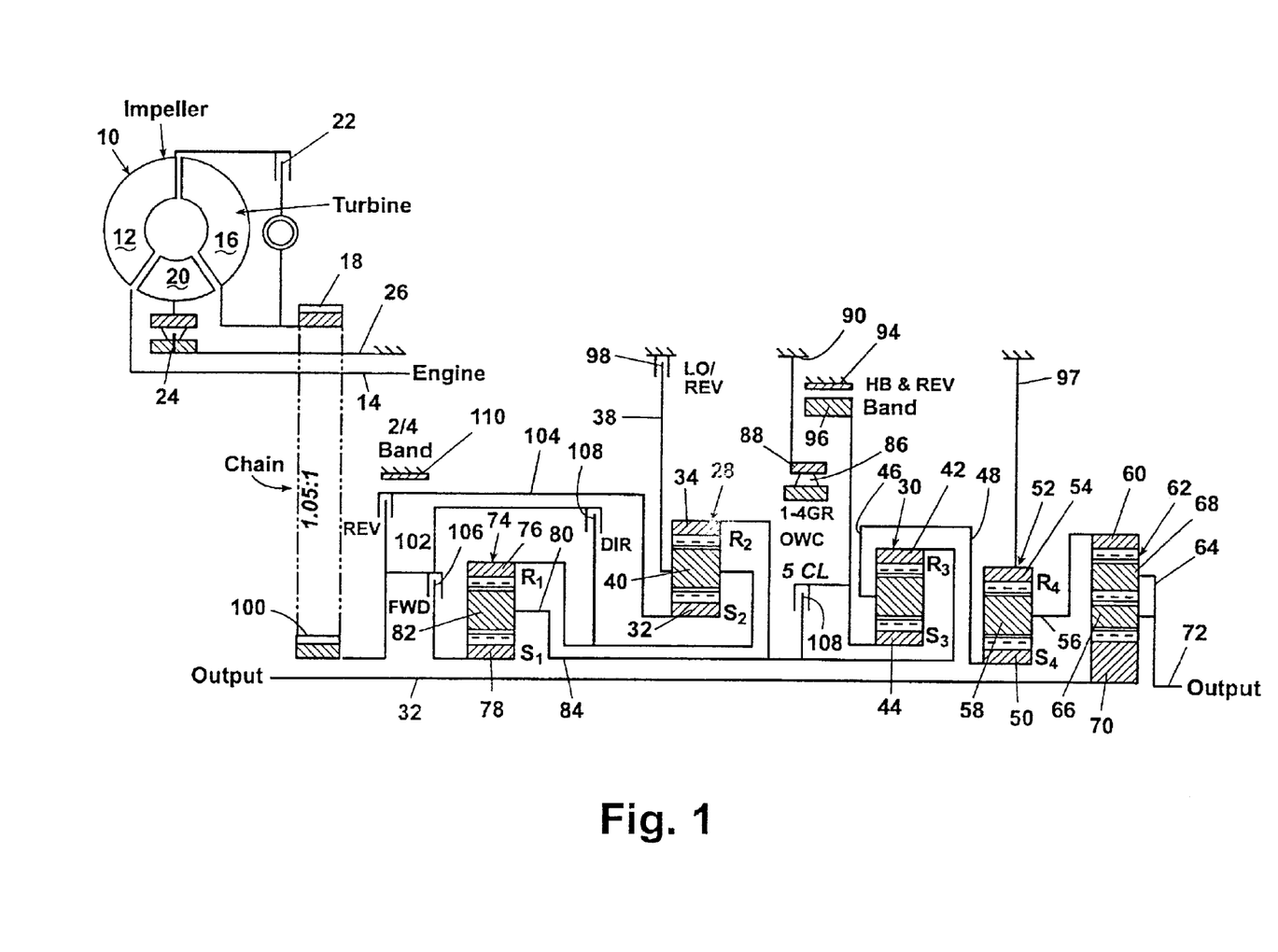
FIG. 1 is a schematic representation of a planetary gear transmission having a forward clutch located in the torque flow path between the hydrokinetic torque converter turbine and the input elements of the gearing.

Referring now to the drawings, there is illustrated in FIG. 1, a hydrokinetic torque converter, shown generally at 10, includes a bladed impeller 12 connected drivably to a vehicle engine crankshaft 14. A bladed turbine 16 is connected to drive sprocket 18 of a chain transfer drive. A bladed stator 20 is located between the toroidal flow exit section of the turbine of the turbine flow entrance section of the impeller and acts in known fashion to change the direction of the toroidal fluid flow, thus making possible a torque multiplication in the torque converter 10.

During steady-state operation in higher gear ratios, a friction bypass clutch 22 may be engaged to drivably connect the impeller 12 and the turbine 16, thus effectively removing the hydrokinetic torque flow path from the driveline. Stator 20 is anchored against rotation in a direction opposite to the direction of rotation of the impeller by an overrunning brake 24, which is grounded to stator sleeve shaft 26.

A pair of simple planetary gear units 28 and 30 is rotatably mounted about the axis of output shaft 32 that is arranged in spaced parallel disposition with respect to the engine crankshaft axis. Unit 28 includes ring gear 34, sun gear 36, carrier 38 and planet pinions 40 that are journalled on carrier 38 in meshing engagement with ring gear 34 and sun gear 36. Gear unit 30 comprises ring gear 42, sun gear 44, carrier 46 and planet pinions 48, which are journalled on carrier 46 in meshing engagement with sun gear 44 and ring gear 42. Carrier 46 forms a torque output element for the gearing and is drivably connected to output member 48, which is connected to final drive sun gear 50 of final drive planetary gear unit 52.

Final drive gear unit 52 includes, in addition to sun gear 50, a ring gear 54, a carrier 56 and planet pinions 58 journalled on carrier 56 in meshing engagement with sun gear 50 and ring gear 54. Carrier 56 acts as a torque output element of the gear unit 52 and is connected to ring gear 60 and differential gear unit 62.

A compound carrier 64 forms a part of the gear unit 62 that rotatably journals a first pair of pinions 66, which mesh with a ring gear 60 and with a second set of planetary pinions 68, the latter meshing with sun gear 70. Sun gear 70 in turn is drivably connected to output shaft 32.

Carrier 64 is drivably connected to a companion torque output shaft 72. Shaft 32 is connected to one traction wheel of the vehicle, and the opposite traction wheel of the vehicle is connected to output shaft 72. The connections between the traction wheels and the respective output shafts is achieved by universal coupling and half shaft assemblies in known fashion.

A third simple planetary gear unit 74 is located between the pair of gear units previously described and the hydrokinetic torque converter. It comprises a ring gear 76, a sun gear 78, a carrier 80 and planet pinions 82 journalled on the carrier 80 in meshing engagement with ring gear 76 and sun gear 78. Carrier 80 is connected to torque transfer sleeve shaft 84, which is drivably connected to ring gear 34 of gear unit 28 and to ring gear 42 of gear unit 30. An overrunning brake 86 that has an outer race 88 grounded to the transmission housing as shown at 90 is adapted to anchor sun gear 44 during operation in each of the first four overdriving ratios, thus providing a torque reaction point for the gear system. Ring gear 54 is permanently anchored to the housing as shown at 92, thus permitting the final drive gear unit 52 to multiply the torque delivered through the gear units 74, 28 and 30 in each of the driving ratios.

A friction brake band 94 surrounds brake drum 96 which, in turn, is connected to sun gear 44. The brake band 94 is applied to anchor the sun gear 44 during hill braking operation and during reverse-drive operation.

A disc brake shown generally at 98 is adapted to anchor the carrier 38 against the transmission housing during operation in the lowest ratio and in reverse drive. Sun gear 36 is a torque input element flow transmission. During operation in reverse drive, sun gear 36 is connected to driven sprocket 100 by means of reverse clutch 102, the latter acting as a driving connection between the driven sprocket 100 and brake drum 104. Sun gear 36 is connected directly to the brake drum 104. Driven sprocket 100 is connected to driving sprocket 18 through a torque transfer drive chain 106. During forward drive operation, drive sprocket 100 is connected to sun gear 78 by forward drive clutch 106. The forward drive clutch 106 is engaged during operation in the first three forward-driving ratios.

A direct-drive clutch 108 connects ring gear 76 with the driven sprocket 100 during operation in the third and fourth forward driving ratios as well as during the fifth driving ratio. When direct drive clutch 108 and the forward clutch 106 are engaged simultaneously, ring gear 76 is connected to sun gear 78 so that the elements of the gear unit 74 rotate in unison with a one-to-one speed ratio.

To effect a fifth forward-driving ratio, friction clutch 109 is applied, thus establishing a driving connection between sleeve shaft 84 and sun gear 44 of gear unit 30 to lock sun gear 44 to ring gear 42 so that the speed ratio developed by gear unit 30 is unity.

The neutral idle feature of the invention is achieved by controlling engagement and release of forward clutch 106. When the vehicle is at a standstill and the engine is idling, the engine 10 will tend to drive the turbine because of the hydrokinetic torque multiplication effect of the converter 10. Thus, a driving torque will be delivered to the traction wheels through the gearing, even when the engine is idling.

In prior art designs, it is necessary to maintain the accelerator pedal at a sufficiently advanced position so that the engine will idle at a speed that will avoid undue engine harshness. It further is necessary for the vehicle operator to maintain his foot on the vehicle brake to avoid creeping of the vehicle with the engine idling. By disengaging the clutch 106 to establish a neutral idle condition, the torque flow path to the traction wheel is interrupted when the engine is idling with the vehicle at a standstill.

Figure 2:
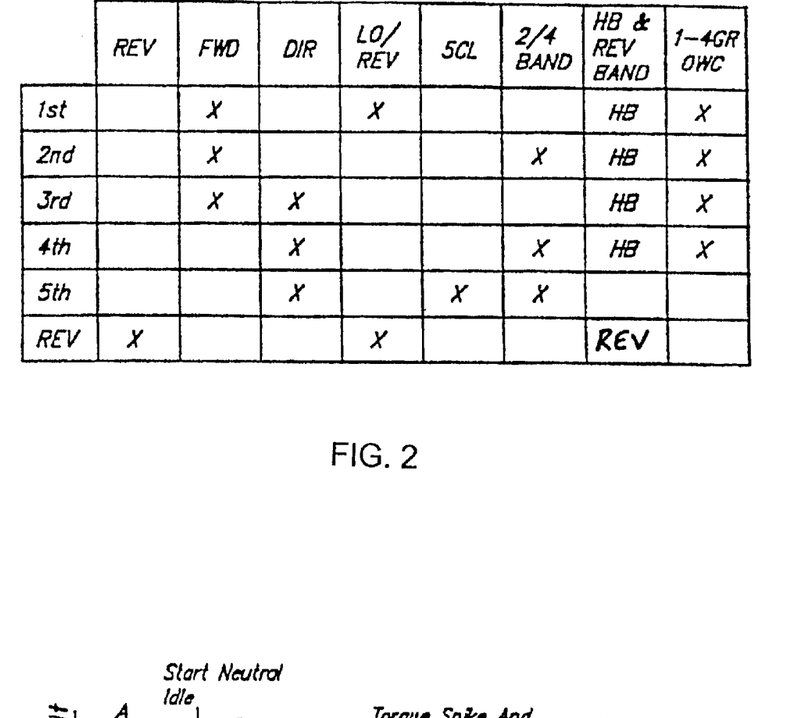
FIG. 2 is a chart that shows a clutch and brake engagement and release pattern for the transmission shown in FIG. 1.

FIG. 2 shows a chart that indicates the clutches and the brakes that are applied and released to establish each of the five forward-driving ratios as well as the reverse ratio. The sun gear 36 is anchored by a second and fourth ratio brake band 110. That brake band is applied also during fifth ratio operation so that sun gear 36 may act as a reaction point as the ring gear 34 is overdriven and as torque is delivered to the gear unit 28 through the carrier 38 and through the direct-drive clutch 108. In FIG. 2, the forward-drive clutch 106 is designated as clutch FWD, the direct-drive clutch 108 is designated as clutch DIR, the reverse disc brake 98 is referred to as the LO/REV brake, the fifth ratio clutch 109 is identified as 5CL clutch, and brake band 110 is identified as 2/4 band.

First ratio drive is achieved by engaging brake band 94, which anchors sun gear 44. Also, disc brake 98 is applied, and forward clutch 106 is applied. Thus, sun gear 78 is connected to the driven sprocket at 100, and the underdriven motion imparted to the carrier 80 is transferred to the ring gear 42 of gear unit 30. In FIG. 2, brake band 94 is referred to as the HB and REV band. The reverse clutch 102 is identified in FIG. 2 as the REV clutch.

Figure 3:
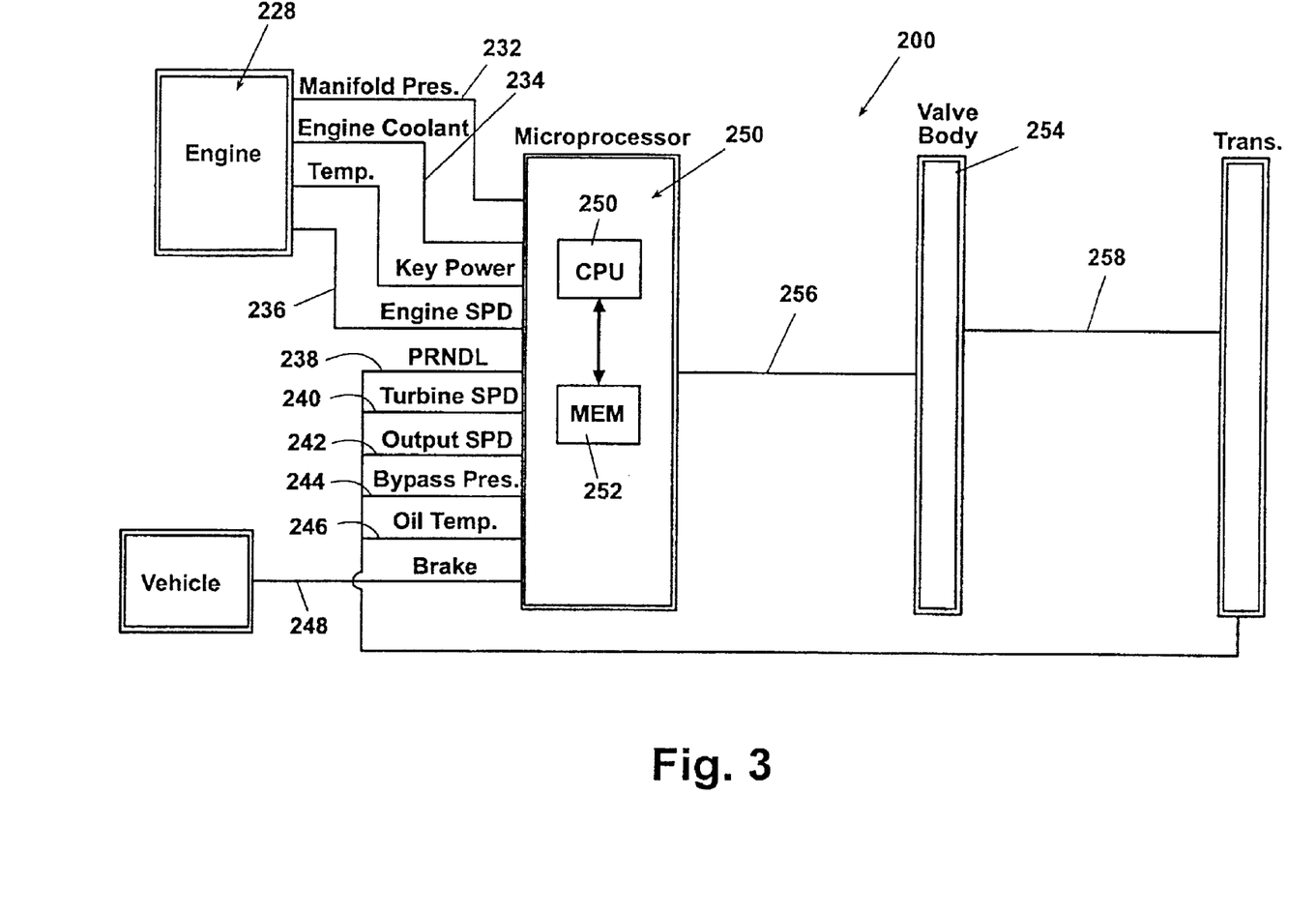
FIG. 3 is a schematic representation of the control system including the electronic microprocessor for controlling clutch engagement in a closed-loop fashion.

A schematic representation of a microprocessor control system, shown generally at 200, is shown in FIG. 3. The engine is generally designated by reference numeral 228. Operating variables for the engine, such as manifold pressure and coolant temperature and engine speed, are measured by analog sensors and distributed to an electronic microprocessor 230. The signal passage for manifold pressure is shown at 232. The engine coolant temperature signal is distributed to the processor 230 through signal line 234. The engine speed signal is distributed to the processor 230 through line 236.

Other variables that are measured and distributed to the processor are a signal indicating the range selection or transmission manual valve position. This signal is distributed through signal passage 238. Turbine speed also is measured, and that value is distributed to the processor through signal line 240. The torque output shaft speed for the transmission is distributed to the processor through signal line 242. A bypass clutch pressure signal is distributed to the processor through signal line 244, but that signal is irrelevant to the present invention. Transmission oil temperature for the engine is measured, and the signal representing that value is distributed to the processor through signal line 246. A brake signal is distributed to the processor through signal line 248. The presence of a signal at line 248 will indicate whether the vehicle brakes are applied or released by the vehicle operator.

The processor 230 will receive the information developed by the sensors and condition it so that it may be used in digital form by the central processor unit. The central processor unit identified at 250 processes the information delivered to the processor 230 in a manner that will be described subsequently using algorithms that are stored in memory 252. The output signals from the processor 230 are delivered to a valve body 254 through signal line 256. The output data includes shift signals delivered to the shift solenoids that control the ratio changes. The operation of the valve body 254 and the solenoid signals are described in commonly-assigned U.S. Pat. No 5,272,630, herein incorporated by reference. The output signal developed by the valve body 254 delivered through signal line 258 controls the operation of the clutches and brakes of the transmission illustrated in FIG. 1.

For purposes of describing the benefits of the present invention, a comparison to prior art neutral idle characteristics will first be made with reference to FIG. 4, which shows the prior art neutral idle clutch characteristics for a transmission having an open loop-type converter. This type of transmission is further described in commonly-assigned U.S. Pat. No. 5,272,630.

Figure 4:
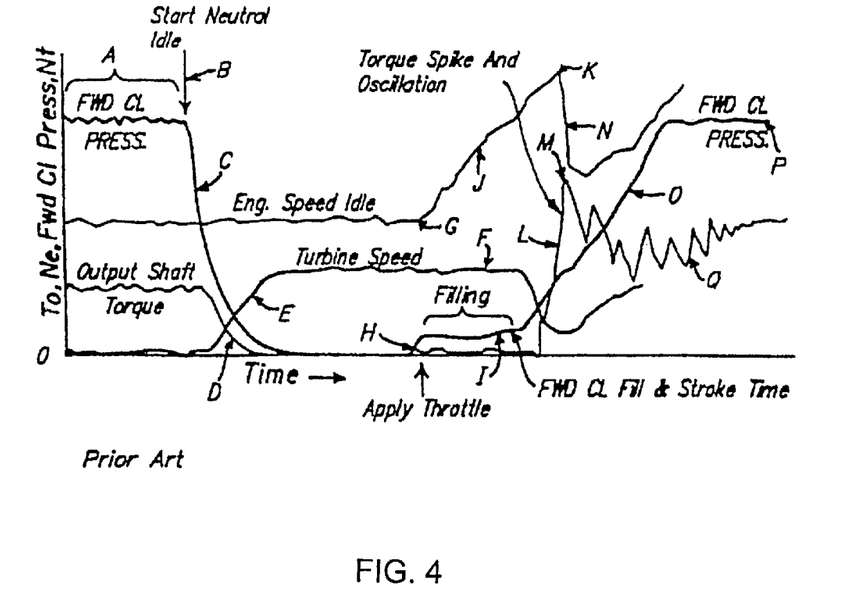
FIG. 4 is a graph that shows output torque and clutch pressure changes as well as the engine speed and turbine speed changes during a neutral idle condition and during a subsequent engagement of the forward clutch for a typical transmission of the kind shown in the prior art references.

In FIG. 4, time is plotted on the abscissa; and output shaft torque, clutch fluid pressure, engine speed and turbine speed are plotted on the ordinate. The forward clutch pressure, the engine speed, the turbine speed and the output shaft torque assume initially the values shown in region A of FIG. 4.

It is seen from FIG. 4 that the turbine speed is zero since the vehicle is at rest. The difference between engine speed and turbine speed represents the slip that exists when the vehicle comes to rest and before the neutral idle mode begins. At time B, the neutral idle mode is initiated, which results in an exhaust of pressure from the forward clutch. This results in a decay of the forward clutch pressure over a short period of time, as indicated by the curve C in FIG. 4. The output shaft torque decays, as shown by curve D, as the forward clutch pressure is relieved.

As the forward clutch loses capacity following initiation of a neutral start mode, the turbine speed will increase, as shown at E, until it reaches the normal turbine speed for engine idle, which may be 600 rpm as shown at F in FIG. 4. The engine speed at that time in a typical vehicle installation may be about 800 rpm as shown at G.

FIG. 4 illustrates at point H what happens, according to the prior art, when the operator terminates the neutral idle mode by advancing the accelerator pedal. An immediate increase in the forward clutch pressure then will occur until a transition pressure indicated at point I is reached. It is during this interval that the clutch servo cylinder is filling and the clutch servo piston is stroking. Because the engine throttle is advanced, the engine speed will respond to the advancing throttle and will increase as shown by the ramp J in FIG. 4. The engine speed continues to increase until the clutch servo is fully stroked. At that time, the engine speed will have reached a peak value shown at K.

When the piston for the forward clutch servo is stroked and the forward clutch gains capacity, the output shaft torque will sharply rise, as indicated by the steep slope curved portion L, until it reaches a peak value shown at M. The achievement of the peak value M is coincident generally with the peak engine speed, the latter immediately decreasing in value at a fast rate, as shown at N. The decreasing engine speed is accompanied by a substantial inertia torque that contributes to the achievement of the peak value M for the output shaft torque. The clutch pressure will continue to increase following the stroking of the clutch servo piston and progressively increase at a rapid rate, as shown by the curve 0, until a final clutch pressure value is reached, as shown at P. The output shaft torque will be subjected to torque fluctuations, as demonstrated by the oscillating torque values Q following clutch engagement.

The prior art torque curve illustrated in FIG. 4 is perceptible as a "slip bump" disturbance that occurs following the advancement of the accelerator pedal when the operator demands engine torque levels that would produce a turbine torque beyond the forward clutch capacity during neutral idle operation. The subsequent uneven engine response is undesirable. The control strategy of the present invention that avoids these undesirable features of the prior art will now be explained with reference to FIGS. 5, 6 and 7.

Figure 5:
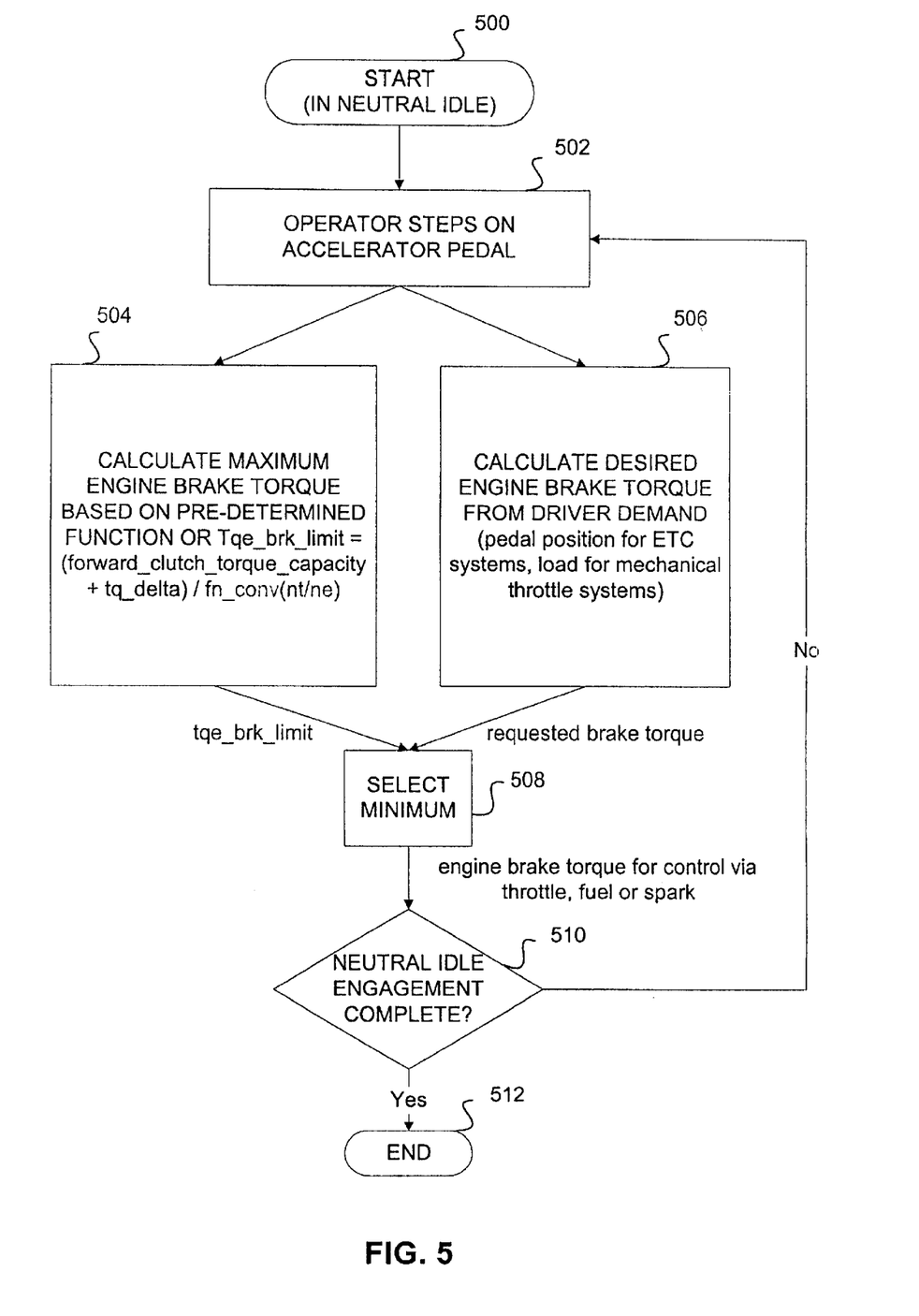
FIG. 5 is flow diagram of the method of controlling engine torque while launching from neutral idle operation by selecting the minimum of an engine brake torque limit and a requested brake torque.

Referring now to FIG. 5, the routine executed by microprocessor 230 for controlling engine torque output during launch from neutral idle operation according to a preferred method of the invention will now described. The vehicle begins in the neutral idle operating condition (step 500). As described above, the neutral idle operating condition results in an exhaust of pressure from the forward clutch at time B in FIG. 4. This results in a decay of the forward clutch pressure over a short period of time, as indicated by the curve C in FIG. 4. The output shaft torque decays, as shown by curve D, as the forward clutch pressure is relieved. As the forward clutch loses capacity following initiation of a neutral start mode, the turbine speed will increase, as shown at E, until it reaches the normal turbine speed for engine idle, which may be 600 rpm as shown at F in FIG. 4. The engine speed at that time in a typical vehicle installation may be about 800 rpm as shown at G.

At some point in time, the vehicle operator advances the accelerator pedal (step 502) to terminate neutral idle operation as shown at H in FIG. 4. Then, the microprocessor 230 determines an engine brake torque limit (step 504) and a requested engine torque output derived from operator demand (step 506). These values are used to determine the amount of torque that will actually be supplied by the engine at that particular time.

Figure 6:
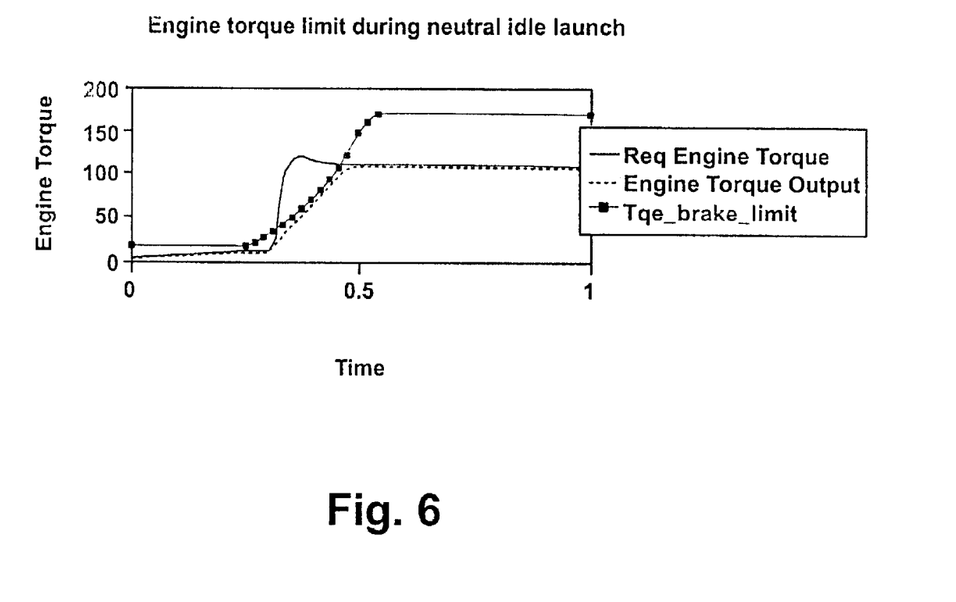
FIG. 6 is a graph showing requested engine torque and engine brake torque limit as a function of time using the method and control system of the invention.

According to the present invention, the engine brake torque limit can be determined in a variety of ways. A first preferred method comprises employing a generally increasing pre-determined function to determine an appropriate engine brake torque limit at a given time subsequent to ceasing neutral idle operation. Specifically, for a given elapsed time since the neutral idle operation was ceased, the function provides an appropriate engine brake torque limit. Because it is known that the capacity of the transmission's forward clutch increases with time, the function provides generally higher engine brake torque limits as the elapsed time increases. The function will generally provide engine brake torque limits that follow the known increasing capacity characteristics of a forward clutch, as illustrated in FIG. 6.

A second preferred method for determining the engine brake torque limit comprises estimating the torque capacity of the forward clutch during the launch period using a mathematical model that depends on various operating parameters, including clutch pressure. Then, the engine brake torque limit is calculated based on the estimated forward clutch torque capacity and a calibrated delta turbine torque offset value. The calibrated delta turbine torque value may be positive or negative to facilitate tuning of forward clutch engagement during neutral idle operation. Specifically, according to the second preferred method, the engine brake torque limit is determined by the following equation:

$$Tqe\_Brk\_Limit = \frac{Forward\_Clutch\_Torque\_Capacity + Tq\_Delta}{Fn\_Conv\left(\frac{Nt}{Ne}\right)}$$

where,
- Nt is the turbine speed,
- Ne is the engine speed,
- Fn__Conv is the torque multiplication of the torque converter. Fn__Conv is a well-known function that can be expressed as the turbine torque divided by the engine torque, and
- Tq__Delta is a calibrated positive or negative offset. Tq__Delta can be a negative offset to reduce the engine torque to ensure short enough engagement time of the forward clutch. Tq__Delta can be a positive offset to compensate for the time lag in generating engine torque.

The forward clutch torque capacity used to determine the engine brake torque limit is calculated using the following equation:

$$Forward\_Clutch\_Torque\_Capacity = Fn\_Cap(\text{clutch pressure, other variables})$$

where,
- Fn__Cap is a function that transforms the forward clutch pressure (either commanded or measured) into a torque capacity based on clutch pressure and other variables, such as transmission fluid temperature, clutch design, and the like. The Fn__Cap function also includes a conversion factor from torque measured at the forward clutch to torque measured at the turbine shaft.

Irrespective of the particular method used to determine the engine brake torque limit, the actual torque output supplied by the engine is limited based on the lesser of the engine brake torque limit and the level of torque requested by the vehicle operator (step 508). In terms of a mathematical expression, the level of torque supplied by the engine is expressed as follows:

$$Controlled\_Engine\_Tq = \min(\text{Requested Torque}, Tqe\_Brk\_Limit)$$

The controller may limit engine torque output in a variety of well-known ways, including adjusting engine air/fuel ratio, engine spark, etc.

Next, the controller determines whether the launch period from neutral idle operation is complete (step 510). If so, the algorithm ends (step 512). If not, then steps 502–508 are repeated. Each time the algorithm is repeated, the engine brake torque limit increases, and, assuming the requested torque output is sufficiently high, so does the actual engine torque output.

FIG. 6 is a graph that compares a sample requested engine torque, the engine brake torque limit, and the actual engine torque output, according to the present invention. The solid line represents the requested engine torque and the line with explicit data points represents the maximum torque brake limit produced by the method of the invention. The dashed line illustrates the actual engine torque output according to the invention. As shown in FIG. 6, the requested engine torque rises steeply due to operator demand at around 0.3 seconds to a maximum engine torque of about 120 ft/lbs. and slightly decreases to a relatively constant value of about 100 ft/lbs. The method of the invention limits the actual engine torque output, producing a less abrupt increase in torque output. The result is a smooth transition from neutral idle operation to full engagement of the front clutch without unnecessarily sacrificing desired power during the launch period.

As describe above, by limiting actual engine output torque based on the clutch capacity of the engaging clutch during vehicle launch, it is possible to maximize available torque to the driver, while at the time preventing uneven response.

Preferred embodiments of the present invention have been disclosed. A person of ordinary skill in the art would realize, however, that certain modifications would come within the teachings of this invention. For example, the teachings of this invention apply when a different clutch other than the forward clutch or identified as the forward clutch is allowed to slip during neutral idle operation. Therefore, the following claims should be studied to determine the true scope and content of the invention.

What is claimed is:

1. A method for controlling a vehicle having an engine coupled to a transmission through a clutch, comprising:
   determining an engine torque limit based on clutch torque capacity during launch from neutral idle operation; and
   adjusting an engine operating parameter to limit output engine torque to said engine torque limit.

2. The method of claim 1, wherein said clutch is a forward clutch.

3. The method of claim 1, wherein the clutch is a reverse clutch.

4. The method of claim 1, wherein the engine operating parameter comprises a fuel injection amount.

5. The method of claim 1, wherein the engine operating parameter comprises an air intake amount.

6. In a system having a vehicle engine coupled to a transmission through a clutch, a method of controlling engine torque output during launch from neutral idle operation, comprising the steps of:
   determining a plurality of engine brake torque limits over a period of time; and
   limiting engine torque output based on said engine brake torque limits.

7. The method of claim 6, wherein said engine torque output at a given time is limited to the lesser of said engine brake torque limit and a requested torque output.

8. The method of claim 6, wherein said engine brake torque limit increases as a function of elapsed time.

9. The method of claim 8, wherein said engine torque output at a given time is limited to the lesser of said engine brake torque limit and a requested torque output.

10. The method of claim 6, wherein said engine brake torque limit is determined based on estimations of the forward clutch torque capacity during launch from neutral idle operation.

11. The method of claim 10, wherein said forward clutch torque capacity estimation is based on clutch pressure.

12. The method of claim 1, wherein said engine brake torque limit is further determined based on an offset value added to said forward clutch torque capacity estimation.

13. A method of controlling engine torque output provided by an engine to a transmission through a clutch, comprising:
   engaging the clutch over a period of time in response to a demand for engine torque;
   determining engine brake torque limits at a plurality of instances throughout said time period; and
   controlling engine torque output in response to said engine brake torque limits.

14. The method of claim 13, wherein said engine torque output is controlled by limiting said engine torque output to the lesser of said demanded engine torque and said engine brake torque limit.

15. The method of claim 13, wherein said engine brake torque limits generally increase with time.

16. A system for transferring power from a vehicle engine, comprising:
   a transmission including a torque input shaft, a torque output shaft, and a gear mechanism adapted to establish a torque flow path between said torque input shaft and said torque output shaft;
   a forward clutch for connecting said torque input shaft to said gear mechanism; and
   a microprocessor for determining a plurality of engine brake torque limits over a period of time during launch from neutral idle operation and controlling engine torque output based on said engine brake torque limits.

17. The system of claim 16, wherein said microprocessor determines said plurality of engine brake torque limits as a function of elapsed time.

18. The system of claim 16, wherein said microprocessor determines said engine brake torque limits based on an estimated torque capacity of said forward clutch.

* * * * *